United States Patent [19]

Engelskirchen et al.

[11] 4,001,210

[45] Jan. 4, 1977

[54] PROCESS FOR MANUFACTURING CELLULOSE CONTAINING 2,3-DIHYDROXYPROPYL ETHER GROUPS

[75] Inventors: Konrad Engelskirchen, Lank, Niederrhein; Joachim Galinke, Dusseldorf-Holthausen, both of Germany

[73] Assignee: Henkel & Cie GmbH, Dusseldorf, Germany

[22] Filed: Mar. 17, 1975

[21] Appl. No.: 558,632

[30] Foreign Application Priority Data

Mar. 29, 1974 Germany .................... 2415155

[52] U.S. Cl. .................. 536/84; 536/95; 106/170

[51] Int. Cl.$^2$ ................. C08B 11/08; C08B 11/20; C08L 1/26

[58] Field of Search ........... 260/232, 231 A, 231 R; 106/170

[56] References Cited

UNITED STATES PATENTS

| 2,135,128 | 11/1938 | Thomas et al. ............... 260/232 |
|---|---|---|
| 2,388,764 | 11/1945 | Reichel et al. ............... 260/232 |
| 2,687,411 | 8/1954 | Higgins ....................... 260/232 |
| 2,834,777 | 5/1958 | Jullander ..................... 260/232 |
| 2,854,447 | 9/1958 | Monson et al. ............... 260/232 |
| 3,356,519 | 12/1967 | Chambers et al. ............ 260/232 |
| 3,498,738 | 3/1970 | Tesoro ......................... 260/232 |
| 3,652,539 | 3/1972 | Miura et al. .................. 260/232 |
| 3,903,075 | 9/1975 | Schminke et al. ............ 260/232 |

*Primary Examiner*—Ronald W. Griffin
*Attorney, Agent, or Firm*—Hammond & Littell

[57] ABSTRACT

A process for the manufacture of cellulose containing 2,3-dihydroxypropyl ether groups, the so-called glycerol ether of cellulose, together with borate ions comprises reacting alkali cellulose with glycidol of one of its derivatives reacting like glycidol under the reaction conditions, and treating the resulting product with borate ions whereby aqueous solutions of the obtained products are especially low in salt or are highly viscous, as well as the 2,3-dihydroxy propyl ether of cellulose containing borate ions produced by this process, along with an aqueous composition comprising water and a mixture of said 2,3-dihydroxypropyl ether of cellulose and borate ions.

10 Claims, No Drawings

PROCESS FOR MANUFACTURING CELLULOSE CONTAINING 2,3-DIHYDROXYPROPYL ETHER GROUPS

THE PRIOR ART

The manufacture of cellulose containing 2,3-dihydroxypropyl ether groups by the reaction of 1-chloro-2,3-dihydroxy-propane with alkali cellulose is known. This process requires the use of a large amount of alkali metal hydroxide, such as sodium hydroxide. In general such an amount of alkali metal hydroxide is used as is equivalent to the amount of etherifying agent employed. Of necessity, a large amount of sodium chloride results, for example at least one mol per mol of 1-chloro-2,3-dihydroxypropane used. This necessitates expensive purification procedures which are made especially difficult by the tendency of the pronouncedly hydrophilic cellulose derivative to swell considerably in the aqueous organic solvents which are employed for washing out the sodium chloride.

OBJECTS OF THE INVENTION

It is an object of the present invention to provide a process for the manufacture of the 2,3-dihydroxypropyl ether of cellulose, the so-called glycerol ether of cellulose, together with borate ions in which alkali cellulose is caused to react with glycidol or one of its derivatives reacting like glycidol under the reaction conditions, and the resulting product is treated with borate ions, whereby aqueous solutions of the obtained products are especially low in salt or are highly viscous.

Another object of the present invention is to simplify the purifying procedures needed in the manufacture of the 2,3-dihydroxypropyl ether of cellulose, and in addition, to provide a process leading to products which are distinguished by an especially high viscosity in aqueous solution by treating the 2,3-dihydroxypropyl ether of cellulose with borate ions.

These and further objects of the present invention will become apparent as the description thereof proceeds.

DESCRIPTION OF THE INVENTION

The present invention concerns a process for the manufacture of the 2,3-dihydroxypropyl ether of cellulose, the so-called glycerol ether of cellulose, together with borate ions in which process, alkali cellulose is reacted with glycidol or one of its derivatives reacting like glycidol under the reaction conditions, and the resulting product is treated with borate ions whereby aqueous solutions of the obtained products are especially low in salt or are highly viscous.

More particularly the present invention provides an improvement in the process for the preparation of the 2,3-dihydroxypropyl ether of cellulose comprising reacting an alkali cellulose, having a weight ratio of air-dried cellulose to alkali metal hydroxide of about 1:0.05 to 0.5, with an etherifying agent selected from the group consisting of glycidol and a derivative of glycidol which reacts like glycidol under the reaction conditions, the mol ratio of said air-dried cellulose to said etherifying agent being from 1:1 to 1:10, at a temperature between 20° C to 120° C, under etherifying conditions while maintaining the reaction mixture at a pH over 7.5 to produce a reaction mixture containing a reaction product, and recovering said 2,3-dihydroxypropyl ether of cellulose; wherein the improvement comprises introducing borate ions into said reaction mixture and washing the salts formed in the presence of said borate ions out of said reaction mixture.

Also the present invention provides a 2,3-dihydroxypropyl ether of cellulose together with borate ions produced by the above-mentioned process.

Moreover the present invention provides an aqueous composition having increased viscosity comprising water containing from 0.5% to 5% by weight based upon the total weight, of a mixture consisting essentially of a 2,3-dihydroxypropyl ether of cellulose as mentioned above and an amount of borate ions effective to produce said increased viscosity.

The present invention is characterized in that borate ions are introduced into the reaction mixture, and that the reaction product is processed by washing out the salts formed in the presence of borate ions.

The starting material for the process according to the invention is cellulose in the form or the grade as is customarily used for the manufacture of cellulose ethers. The process known per se in cellulose chemistry for epoxide reactions is used for the reaction of cellulose with glycidol or its derivatives, which process is carried out in the presence of an alkali metal hydroxide.

According to a preferred embodiment of the invention, the borate ions are introduced into the reaction mixture by neutralizing the alkali metal hydroxide present, at least partially, with boric acid or with an easily saponifiable ester of boric acid, such as a lower-alkyl ester of boric acid, preferably trimethyl borate. The borate ions used for the neutralization are introduced after the reaction has been completely carried out or at least partially carried out. The borate ions are $BO_3^{---}$ ions in the solution of the reaction mixture which is generally an aqueous solution.

The addition of borate ions according to the invention had the advantages of leading to an appreciable increase in the time of dissolution as compared with the 2,3-dihydroxypropyl ethers of cellulose manufactured according to the conventional methods. Among other results, the swelling capacity of these cellulose derivatives in organic solvents and in water is lessened to a substantial degree. The extent of this reduction in the time required for solution depends upon the concentration of the borate ions and can be regulated via the amount of boric acid used for the neutralization of the alkali.

For the neutralization of the alkali after the reaction with glycidol, it is possible to employ either boric acid alone or an easily saponifiable derivative, such as an ester derivative, such as trimethyl borate. In general, boric acid is employed mixed with inorganic and/or organic acids, such as hydrochloric acid, phosphoric acid, nitric acid, or a lower-alkanoic acid such as acetic acid or propionic acid. A mixture of boric acid and hydrochloric acid is preferred. The use of boric acid alone for the neutralization of the alkali is especially advantageous when an aqueous solution of the 2,3-dihydroxypropyl ethers of cellulose is intended to have a high viscosity. The extent to which other acids are concomitantly used depends, of course, upon the amount of alkali which is present during the etherification. Boric acid can be also replaced by an easily saponifiable boric acid derivative, such as an ester derivative for example a lower-alkyl ester of boric acid such as trimethyl borate. When a solvent is used in the glycidol reaction, the boric acid or the boric acid ester dissolves especially well in the reaction mixture.

In general the alkali is neutralized only after the etherification reaction has been completed. In special cases, the primary amount of alkali can be also neutralized when the glycidol has been only partially converted. This is particularly advantageous when the etherification reaction is carried out in a ketone solvent medium, for example, an alkanone having 3 to 6 carbon atoms such as acetone, which at higher alkali metal hydroxide concentrations, has the tendency to undergo auto-condensation.

Subsequent to the neutralization, the product is isolated by centrifuging or filtering and purified by washing with organic solvents that are miscible with water. Suitable washing liquids are primary and secondary alcohols or ketones for example lower alkanols, such as methanol, ethanol or isopropanol, and lower alkanones such as acetone which can contain up to 60% by weight of water. Of course, mixtures of these solvents can be likewise used in the purification process. Under certain circumstances, depending upon how much increase in the time of solution of the 2,3-dihydroxypropyl ether of cellulose has occurred, the latter can be washed even with cold water.

According to a preferred embodiment of realizing the invention, the etherification reaction is carried out by a suspension method. Thus, the fibrous or powdered cellulose is suspended in an organic solvent, intensively mixed with added aqueous sodium hydroxide, and etherified with glycidol at temperatures of about 20° C to 120° C, preferably 40° C to 80° C. The amount of alkali metal hydroxide, such as sodium hydroxide solution is so chosen that the ratio by weight of air-dried cellulose to sodium hydroxide amounts to about 1 : 0.05 to 0.5, preferably 1 : 0.1 to 0.3. The weight ratio of air-dried cellulose to water amounts to 1 : 0.2 to 3, preferably 1 : 0.5 to 2. Although larger amounts of sodium hydroxide and water can possibly be used, this use of larger amounts can cause side-reactions to become too strong.

Suitable suspending agents are organic solvents that are at least partially miscible with water and are to a large extent inert with respect to glycidol, for example, secondary alcohols, for example secondary lower alkanols such as isopropanol, especially tertiary alcohols for example tertiary lower-alkanols such as tert-butanol, ketones for example lower alkanones such as 2-butanone, and cyclic oxaalkanes and dioxaalkanes having 3 to 5 carbon atoms such as dioxane or tetrahydrofuran. These solvents can be used either by themselves or as mixtures, if necessary, also combined with organic solvents that are immiscible with water, for example aliphatic and aromatic hydrocarbons having 5 to 8 carbon atoms such as hexane, benzene or toluene. Such quantities of the suspending agents are used that suspensions are formed which can be easily stirred. This requires ratios by weight of air-dried cellulose to solvent of about 1:5 to 30, especially 1 : 8 to 25, depending upon the degree of dispersion of the cellulose.

The etherification reaction may also be carried out with a derivative of glycidol which reacts like glycidol under the reaction conditions. Suitable examples of these derivatives of glycidol include its easily saponifiable derivatives, such as the lower alkanoic acid esters of glycidol for example glycidol acetate.

In the etherification of cellulose it is necessary to maintain the reaction medium at a pH of 7.5 or over during the etherification.

The quantity of glycidol used for the etherification reaction is not critical for the process as long as the celluloses obtained are soluble in dilute sodium hydroxide or in water. The mol ratio of air-dried cellulose to glycidol can be varied between about 1:1 and 1:10, preferably between 1:2 and 1:5. Of course, higher amounts of glycidol than 10 mols per anhydroglucose unit can be employed. However, economic considerations are opposed to the use of such high quantities of glycidol which do not contribute any advantages with respect to the solution properties of the 2,3-dihydroxypropyl ether of cellulose.

For washing out the reaction products from 10 to 50 times, especially 15 to 30 times the amount by weight of solvents is used based upon the weight of the reaction product. The solvent may if necessary contain water. Hence, in general, several portions of the solvent are used unless a continuous process is employed. The purified 2,3-dihydroxypropyl ethers of cellulose containing borate ions are dried at room temperature or at elevated temperatures under normal pressure or under reduced pressures and are subsequently ground, if necessary.

Preferably the amount of borate ions present in the dried, purified 2,3-dihydroxypropyl ethers of cellulose containing borate ions is from 1% to 10% of the total weight.

The following examples are merely illustrative of the present invention without being deemed limitative in any manner thereof. The viscosities of solutions disclosed in the following examples were measured with a Brookfield viscosimeter, model RVT, at 20 rpm.

EXAMPLE 1

86 gm of air-dried cellulose powder (0.5 of bone-dry cellulose) was suspended in 1,620 gm of acetone and intensively stirred while a solution of 30 gm of sodium hydroxide in 162 gm of water was added within 20 minutes. Stirring was continued for an additional 10 minutes. Then, 111 gm of glycidol was added to the sodium cellulose suspension at room temperature. Next, the reaction mixture was heated to 60° C, and stirring this temperature was continued for 3 hours.

After the reaction mixture had been allowed to cool, a portion of it was neutralized with boric acid, and the remainder was neutralized with hydrochloric acid (as a comparison experiment). After the aqueous acetone suspending agent had been separated, the product that had been neutralized with boric acid was washed twice with acetone and dried in the vacuum drying oven at 70° C. The product that had been neutralized with hydrochloric acid was washed 5 times with 80% acetone, was dewatered with pure acetone, and was likewise dried under vacuum at 70° C.

Then, aqueous 4% solutions were prepared from the dried products. The solution of the product that had been neutralized with boric acid had a viscosity of 70,000 cP. The comparison sample had a viscosity of 400 cP.

EXAMPLE 2

43 gm of air-dried cellulose powder (0.25 mol of bone-dry cellulose) was suspended in 600 gm of acetone and vigorously stirred while a solution of 15 gm of sodium hydroxide in 60 gm of water was added within 15 minutes. Stirring was continued for 5 minutes. After the addition of 74 gm of glycidol, the reaction mixture was heated to 60° C and then refluxed for 1.5 hours while being stirred.

AFter the reaction mixture had been allowed to cool, 7.75 gm of boric acid dissolved in 70 gm of water was stirred in. The cellulose derivative was filtered off, washed twice with acetone, and dried in a vacuum drying oven at 70° C. 118 gm of a slightly yellowish product was obtained, and an aqueous 2% solution of the product was clear and had a viscosity of 55,000 cP.

The time required for solution of this product as a function of the solution temperature is shown in Table I.

TABLE I

| Solution Temperature ° C | Solution Rate(*) min. |
|---|---|
| 22 | 180 |
| 30 | 90 |
| 40 | 30 |
| 50 | 8 |

(*)Average values

COMPARATIVE EXAMPLE 2

A procedure analogous to that described in Example 2 was used, except that for comparison after the reaction had been completed, a mixture of acetic acid and concentrated hydrochloric acid in a ratio by weight of about 10:1 was used for neutralization.

After the cellulose derivative had been separated from the reaction mixture, it was washed 5 times each time with 800 gm of aqueous 80% acetone dewatered with pure acetone, and dried.

An aqueous 2% solution of the reaction product (93 gm of cellulose ether) had a viscosity of 1,100 cP. This product required 20 minutes (average values) to dissolve at a temperature of 25° C.

EXAMPLE 3

43 gm of air-dried cellulose powder (0.25 mol of bone-dry cellulose) was suspended in 600 gm of acetone and vigorously stirred while 15 gm of sodium hydroxide dissolved in 60 gm of water was added within 15 minutes. The stirring was continued for 10 minutes. Then, 55.5 gm of glycidol was added to the sodium cellulose suspension, and the mixture was heated to about 60° C while being refluxed. After 30 minutes, 2.6 gm of trimethyl borate was added, and stirring as well as refluxing was continued for 2.5 hours.

The reaction mixture was cooled to room temperature, and 30 gm of concentrated hydrochloric acid was added. The cellulose derivative was filtered off, washed twice, each time with 800 gm of an aqueous 45% acetone, dewatered with pure acetone, and dried in the vacuum drying oven at 70° C.

80 gm of a slightly yellowish product was obtained. The aqueous 2% solution of this product had a viscosity of 110,000 cP.

EXAMPLE 4

A procedure analogous to that described in Example 3 was repeated, except that after a reaction time of 30 minutes, 5.2 gm of trimethyl borate was added to the reaction mixture and that after completion of the reaction, 22.5 gm of concentrated hydrochloric acid was added. After the cellulose ester had been suspended in 1.5 liter of water at 20° C for 5 minutes, it was filtered off, washed with 1 liter of water on a vacuum filter, dewatered with acetone, and dried in a vacuum drying oven at 70° C.

75 gm of an almost white product was obtained. The aqueous 2% solution of this product had a viscosity of about 85,000 cP.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. In the process for the preparation of the 2,3-dihydroxypropyl ether of cellulose wherein an alkali cellulose prepared by reacting cellulose with an alkali metal hydroxide in weight ratio of about 1:0.05 to 0.5 is reacted with an etherifying agent selected from the group consisting of glycidol and a derivative of glycidol which reacts like glycidol under the reaction conditions, the mol ratio of said cellulose to said etherifying agent being from 1:1 to 1:10, at a temperature between 20° C. to 120° C., under etherifying conditions in suspension in an aqueous solution of an inert organic liquid having a pH over 7.5, and recovering the 2,3-dihydroxypropyl ether of cellulose thereby formed: the improvement which comprises introducing a compound which provides borate ions into said cellulose ether suspension thereby neutralizing said suspension, and washing said ether thereby removing the salts in solution formed by addition of said compound.

2. The process of claim 1, wherein said borate ions are introduced by addition of boric acid.

3. The process of claim 1, wherein said borate ions are introduced by neutralizing the alkali present by addition of a boron material selected from the group consisting of (a) boric acid, (b) a mixture of boric acid with an acid selected from the group consisting of hydrochloric acid, phosphoric acid, nitric acid, acetic acid and propionic acid, and (c) an easily saponifiable derivative of boric acid.

4. The process of claim 3, wherein said material is a mixture of boric acid and hydrochloric acid.

5. The process of claim 3, wherein said boron material is added after said reaction has been completely carried out.

6. The process of claim 1, wherein said borate ions are introduced by addition of a lower-alkyl ester of boric acid.

7. The process of claim 6, wherein said ester is trimethyl borate.

8. A 2,3-dihydroxypropyl ether of cellulose containing 1% to 10% by weight of borate ions.

9. The cellulose ether-borate ion composition of claim 8 in substantially dry state.

10. An aqueous solution containing from 0.5% to 5% by weight of a mixture of an ether-borate ion composition according to claim 8.

* * * * *